United States Patent
Kim

(10) Patent No.: US 7,570,316 B2
(45) Date of Patent: Aug. 4, 2009

(54) PROTECTING COVER FOR A DISPLAY DEVICE AND DISPLAY DEVICE HAVING THE SAME

(75) Inventor: Se-Bong Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 411 days.

(21) Appl. No.: 11/567,816

(22) Filed: Dec. 7, 2006

(65) Prior Publication Data

US 2007/0132907 A1   Jun. 14, 2007

(30) Foreign Application Priority Data

Dec. 8, 2005   (KR) ...................... 10-2005-0119242

(51) Int. Cl.
G02F 1/1333 (2006.01)
G02F 1/1345 (2006.01)

(52) U.S. Cl. ......................................... 349/58; 349/150
(58) Field of Classification Search .................. 349/150
See application file for complete search history.

(56) References Cited

U.S. PATENT DOCUMENTS 5,670,994 A * 9/1997 Kawaguchi et al. ......... 345/206
7,106,317 B2 * 9/2006 Kim et al. ................... 345/206

FOREIGN PATENT DOCUMENTS

KR   1020000066493   11/2000

* cited by examiner

Primary Examiner—Michelle R. Connelly-Cushwa
Assistant Examiner—Chris Chu
(74) Attorney, Agent, or Firm—Cantor Colburn LLP

(57) ABSTRACT

A protecting cover bends a signal transfer film connected to a display panel toward a sidewall of a container and includes a first adhesive region attached to a sidewall of a front case, a second adhesive region attached to a bottom plate of the container and a guide region between the first and the second adhesive regions. A boundary line between the guide region and the second adhesive region is spaced apart from an edge of the second adhesive region by a first gap in a position corresponding to the signal transfer film and is spaced apart by a second gap that is wider than the first gap in a position corresponding to a space between the signal transfer films.

18 Claims, 11 Drawing Sheets

PROTECTING COVER FOR A DISPLAY DEVICE AND DISPLAY DEVICE HAVING THE SAME

This application claims priority to Korean Patent Application No. 2005-119242 filed on Dec. 8, 2005, and all the benefits accruing therefrom under 35 U.S.C. §119, the contents of which are herein incorporated by reference in their entirety.

BACKGROUND OF THE INVENTION

1. Field of the Invention

Exemplary embodiments of the present invention relate to a protecting cover for a display device and a display device having the protecting cover. More particularly, exemplary embodiments of the present invention relate to a protecting cover that is capable of preventing an unnecessary external force from being applied to a signal transfer film and guiding the signal transfer film, and a display device having the protecting cover.

2. Description of the Related Art

A liquid crystal display ("LCD") device is one of the flat display devices displaying images using a liquid crystal. The LCD device is relatively thin and light and has low power consumption compared to the other display devices, thereby operating at relatively low driving voltage. Therefore, the LCD device is widely used in various data processing applications.

Many researches and technical developments have been actively pursued to reduce the number of parts, weight and volume of the LCD device. Korean Patent Laid-Open Publication No. 2000-0066493, which was filed by the same inventor working on the present invention, entitled by "Tape Carrier Package, LCD Panel Assembly Containing the Tape Carrier Package, LCD Device Containing the Liquid Crystal Panel Assembly and Method for Assembling the Same," discloses a LCD device without a gate printed circuit board that increases a thickness of the LCD panel. In the LCD device, a data driving signal from an integrated printed circuit board that generates a gate driving signal and the data driving signal is inputted into a data line through an integrated printed circuit board, a data tape carrier package and the data line. The gate driving signal is inputted into the gate line through the integrated printed circuit board, the data tape carrier package, the signal transfer pattern formed on thin-film-transistor substrate, a gate tape carrier package and the gate line.

As mentioned above, in the display panel without the gate printed circuit board, the gate tape carrier package protrudes toward an outside of a sidewall of a container that receives the display panel. Hence, when fabricating the display device, an unnecessary external force may be applied to the gate tape carrier package such that the gate tape carrier package may be frequently damaged. For example, a top chassis that is combined to the container to fix the display panel interacts with the gate tape carrier package, so that the gate tape carrier tape may not be disposed at a designated position but is bent toward an undesirable direction. Accordingly, a crack is generated in a conductive pattern that is formed on the gate tape carrier package. As a result, the display panel is not properly operated.

As mentioned above, to solve the problem caused by the gate tape carrier package being damaged during the fabrication, generally, the LCD device includes a protecting member. The protecting member is attached to a portion of the gate carrier package to guide the gate carrier package toward the sidewall of the container.

However, because the protecting member and the gate tape carrier package are combined with each other, accordingly, the positions of the protecting member and the gate tape carrier package are relatively fixed when attaching the protecting member to the top chassis. Here, the top chassis fixes the bottom plate of the container or the display panel to the container. In addition, an external force is applied to the gate tape carrier package so that the gate tape carrier package may be still damaged.

BRIEF SUMMARY OF THE INVENTION

Exemplary embodiments provide a protecting cover for a display device that is capable of defining an adhesive region and a guide region that bends a signal transfer film and reducing or effectively preventing an undesirable external force from being applied to the signal transfer film.

Exemplary embodiments provide a display device including the above-mentioned protecting cover for a display device.

In an exemplary embodiment there is provided a protecting cover for a display device. The protecting cover bends a signal transfer film connected to a display panel toward a sidewall of a container receiving a display panel. The protecting cover includes a first adhesive region, a second adhesive region and a guide region. The first adhesive region is attached to a sidewall of a front case combined with the container and covering an edge of the display panel. The second adhesive region is attached to a bottom plate of the container. The guide region is between the first adhesive region and the second adhesive region to guide the signal transfer film. A first portion of a boundary line between the guide region and the second adhesive region in a position corresponding to the signal transfer film is spaced apart from an edge of the second adhesive region by a first gap. A second portion of the boundary line between the guide region and the second adhesive region in a position corresponding to a space between adjacent signal transfer films is spaced apart from the edge of the second adhesive region by a second gap wider than the first gap.

In an exemplary embodiment, the protecting cover may further include an adhesive film and a base film. The adhesive film may include the first adhesive region, the second adhesive region and the guide region. The base film may be attached to the guide region and bend an edge portion of the signal transfer film toward the sidewall of the container. The boundary line may be defined by a profile of the base film. The edge portion of the signal transfer film may be disposed in the guide region.

In an exemplary embodiment, the protecting cover may include a base film, a first adhesive film and a second adhesive film. The base film may include the first adhesive region, the second adhesive region and the guide region. The first adhesive film may be attached to the first adhesive region and the second adhesive film may be attached to the second adhesive region, a profile of the second adhesive film defining the boundary line.

In an exemplary embodiment there is provided a display device. The display device includes a container, a panel assembly, a front case and a protecting cover. The container includes a bottom plate and a sidewall. The sidewall is placed on an outer side of the bottom plate and forms a receiving space. The panel assembly includes a display panel and a signal transfer film. The display panel is disposed in the receiving space. The signal transfer film is connected to an edge portion of the display panel. The front case includes a first face and a second face. The first face covers the edge portion of the display panel. The second face covers the sidewall of the container. The protecting cover includes a first adhesive region, a second adhesive region and a guide region. The first adhesive region is attached to the second face. The second adhesive region is attached to a rear face of the bottom plate. The guide region is between the first adhesive region and the second adhesive region to guide the signal transfer film. A first portion of a boundary line between the guide region and the second adhesive region in a position corresponding to the signal transfer film is spaced apart from an edge of the second adhesive region by a first gap. In addition, a second portion of the boundary line between the guide region and the second adhesive region in a position corresponding to a space between the signal transfer films is spaced apart from the edge of the second adhesive region by a second gap that is wider than the first gap.

In an exemplary embodiment, the protecting cover may further include an adhesive film and a base film. The adhesive film may include the first adhesive region, the second adhesive region and the guide region. The base film may be attached to the guide region and define the boundary line to bend an edge portion of the signal transfer film toward the sidewall of a container.

In an exemplary embodiment, the edge portion of the signal transfer film may be spaced apart from an edge of the second adhesive region by a third gap that is wider than the first gap and narrower than the second gap.

In an exemplary embodiment of the present invention, the protecting cover may further include a base film, a first adhesive film and a second adhesive film. The base film may include the first adhesive region, the second adhesive region and the guide region. The first adhesive film may be attached to the first adhesive region and the second adhesive film may be attached to the second adhesive region and define the boundary line. The first adhesive film is attached to the second face and the second adhesive film is attached to a rear face of the bottom plate.

In an exemplary embodiment, the second face may have an incision part exposing a portion of the bent signal transfer-film. A width of the incision part may be substantially equal to or wider than that of an individual one of the signal transfer film or outermost edges of signal transfer films. Portions of the signal transfer film exposed through the incision part are attached to the first adhesive region.

In an exemplary embodiment, the sidewall may have a chamfered part on which a driving chip mounted on the signal transfer film is arranged. A width of the chamfered part may be substantially equal to or wider than an individual one of the signal transfer film or outermost edges of outermost signal transfer films.

In an exemplary embodiment, when fabricating a display device, a signal transfer film absorbs an external force since the signal transfer film is attached to an attachment region of the protecting cover. Thus, damage by the external force to the signal transfer film is reduced or effectively prevented.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

Figure 1:
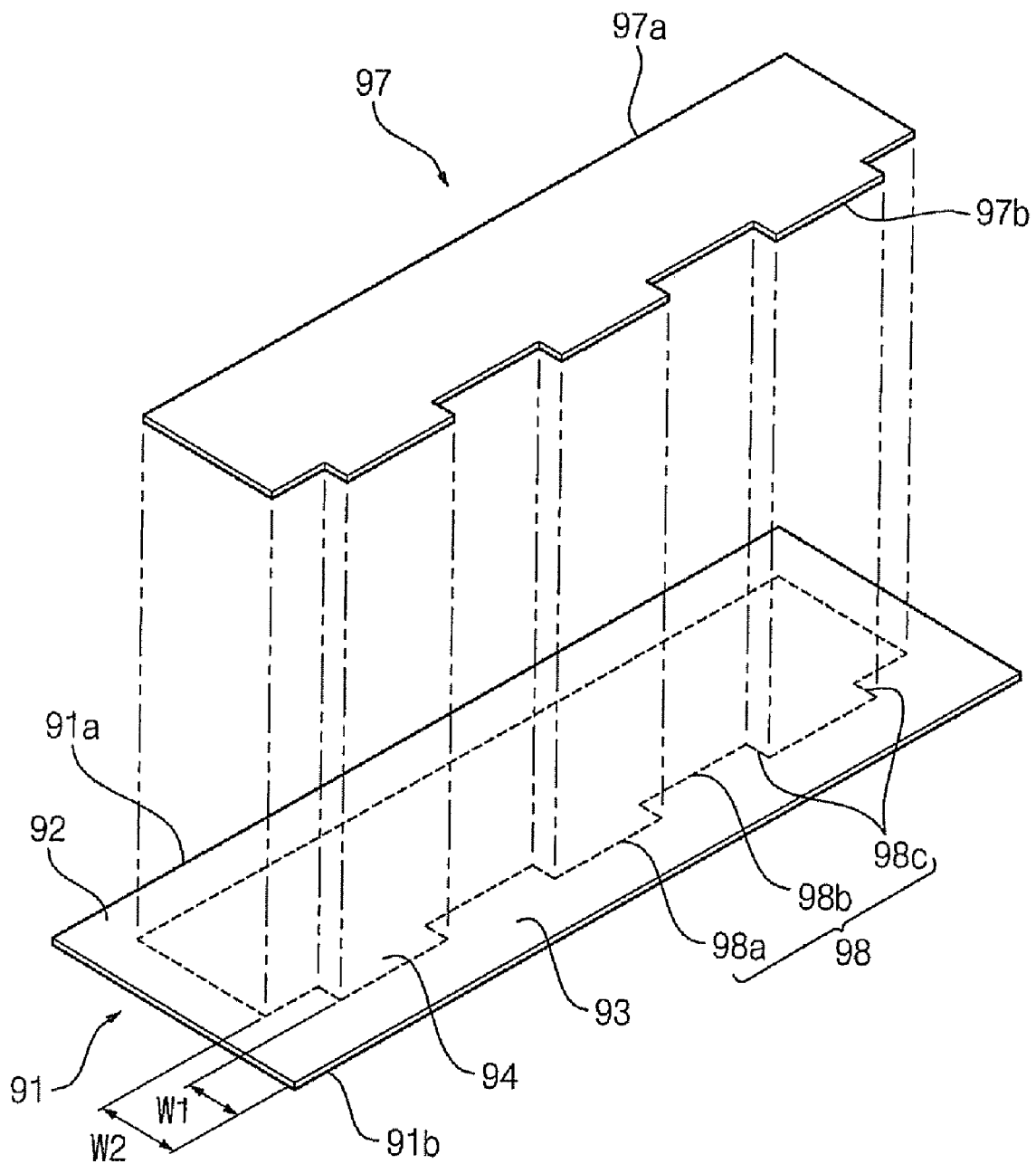
FIG. 1 is an exploded perspective view illustrating an exemplary embodiment of a protecting cover in accordance with the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like reference numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" the other elements or features. Thus, the example term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the present invention are described herein with reference to cross-sectional illustrations that are schematic illustrations of idealized embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In an exemplary embodiment of a display device without a printed circuit board, which includes a signal transfer film connected to a display panel and protruded toward an outside of the display panel, a protecting cover bends the signal transfer film toward a predetermined position to guide the signal transfer film.

The display panel includes a lower substrate, an upper substrate and a liquid crystal layer interposed between the lower substrate and the upper substrate. The lower substrate includes a data line and a gate line crossing the data line. The upper substrate faces the lower substrate.

The display panel receives a gate driving signal and a data driving signal from an integrated printed circuit board generating the gate driving signal and the data-driving signal. Particularly, the data driving signal is inputted into the data line formed on the lower substrate through the integrated printed circuit board, a data tape carrier package and the data line. In the meantime, the gate driving signal is inputted into the gate line through the integrated printed circuit board, the data tape carrier package, a signal transfer pattern formed on the lower substrate, a gate tape carrier package and the gate line.

The display panel is contained in a container. A front case is combined with the container to expose an effective display region of the display panel. Here, the front case bends the gate tape carrier package toward a space under the display panel.

The protecting cover bends an edge portion of the gate tape carrier package exposed from the front case toward a sidewall of the container.

Figure 2:
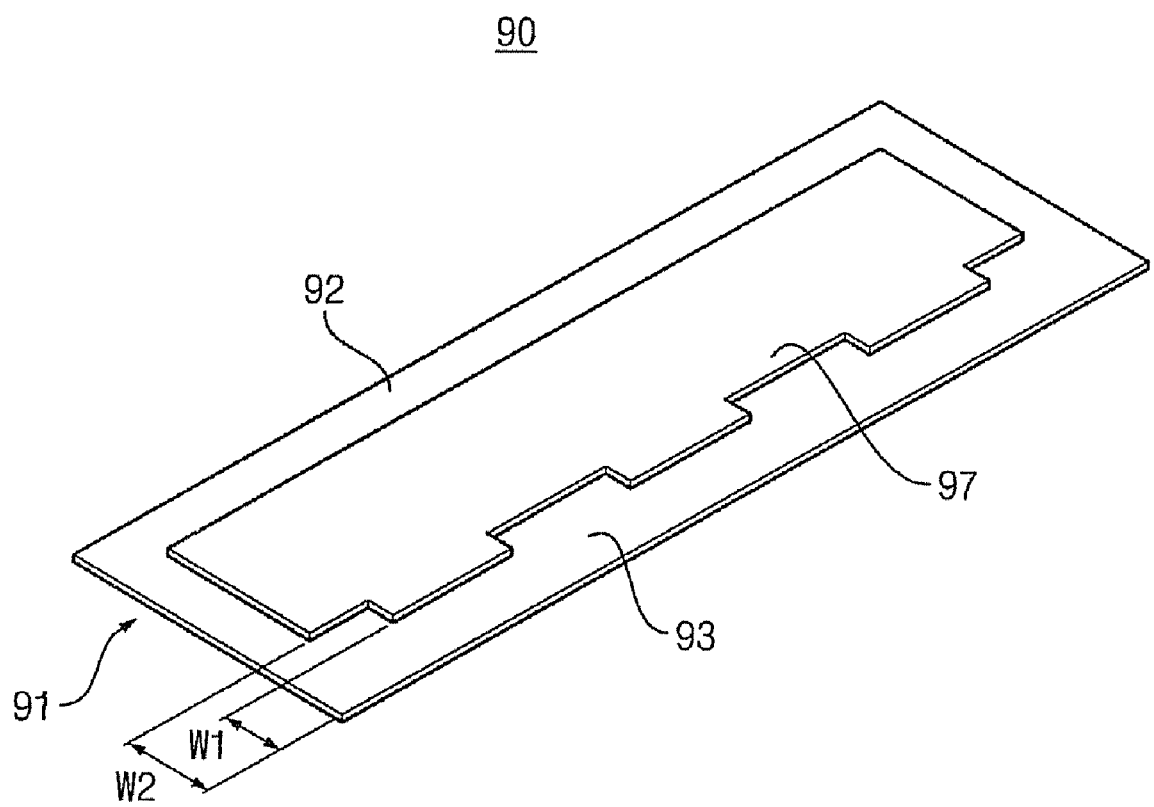
FIG. 2 is a perspective view illustrating a combined protecting cover shown in FIG. 1.

FIG. 1 is an exploded perspective view illustrating an exemplary embodiment of a protecting cover in accordance with the present invention. FIG. 2 is a perspective view illustrating a combined protecting cover shown in FIG. 1.

Referring to FIGS. 1 and 2, the protecting cover 90 includes a first adhesive region 92, a second adhesive region 93 and a guide region 94. The first adhesive region 92 is adhered to a side face of the front case and the second adhesive region 93 is adhered to a rear face of a bottom plate in the container. The guide region 94 is placed between the first adhesive region 92 and the second adhesive region 93 to essentially form boundary lines with the first adhesive region 92 and the second adhesive region 93, respectively. An edge portion of the signal transfer film is disposed in the guide region 94. The signal transfer film is guided toward the sidewall of the container.

An adhesive material is disposed on the first adhesive region 92 and the second adhesive region 93. A non-adhesive material is disposed on the guide region 94 so that the signal transfer film may slide on the guide region 94.

In an exemplary embodiment, the protecting cover 90 includes an adhesive film 91 and a base film 97 as illustrated in FIG. 1 and FIG. 2 defining the first adhesive region 92, the second adhesive region 93 and the guide region 94. The adhesive film 91 includes long (longitudinal) sides and short (transverse) sides. The long sides of the adhesive film 91 include a first long side 91a and a second long side 91b. The base film 97 includes long (longitudinal) sides and short (transverse) sides. The long sides of the base film 97 include a first long side 97a and a second long side 97b.

In one exemplary embodiment, the adhesive film 91 includes an adhesive tape. The adhesive film 91 may have a substantially rectangular shape. A first long side 91a and a second long side 91b of the adhesive film 91 may correspond to a longitudinal direction of the sidewall of the container.

The base film 97 extends substantially along the long side direction of the adhesive film 91 and has a planar area smaller than that of the adhesive film 91. The short side of the base film 97 is shorter than that of the adhesive film 91 and the long side of the base film 97 is shorter than that of the adhesive film 91. In exemplary embodiments, the base film 97 includes a material, such as polyethylene terephthalate, which is flexible and has an electrically good insulating property.

The base film 97 is disposed on and attached to the adhesive film 91 and spaced apart from an edge of the adhesive film 91 by a predetermined distance. Accordingly, the first adhesive region 92, the second adhesive region 93 and the guide region 94 are respectively defined.

The base film 97 defines the guide region 94. The first adhesive region 92 is defined between an edge of the first long side 91a of the adhesive film 91 and an edge of a first long side 97a of the base film 97. The second adhesive region 93 is defined between an edge of the second long side 91b of the adhesive film 91 and an edge of a second long side 97b of the base film 97. An edge profile of the base film 97 is considered as defining the boundary lines between the base film 97 and the first adhesive region 92 and between the base film 97 and the second adhesive region 93.

As in the illustrated embodiment of FIGS. 1 and 2, the second long side 97b of the base film 97 has an uneven profile of which protrusion and recession are alternately arranged.

A boundary line 98 on the adhesive film 91 between the guide region 94 and the second adhesive region 93 has an uneven edge shape corresponding to the profile or shape of the second long side 97b of the base film 97. The boundary line 98 includes a first portion 98a, a second portion 98b and a third portion 98c. The first portion 98a of the boundary line 98, in a position corresponding to the signal transfer film, is spaced apart from an edge of the second adhesive region 93 by a first gap W1. The second portion 98b of the boundary line 98 in a position corresponding to a space between the signal transfer films is spaced apart from the edge of the second adhesive region 93 by a second gap W2. The second gap W2 is wider than the first gap W1.

The first and second portions 98a and 98b may be substantially parallel to a corresponding edge of the adhesive film 91 and an opposing edge of the base film 97. The third portion 98c connects the first portion 98a and the second portion 98b and may be substantially perpendicular to the corresponding edge of the adhesive film 91 and the opposing edge of the base film 97. An edge portion of the signal transfer film is disposed in the guide region 94.

Figure 3:
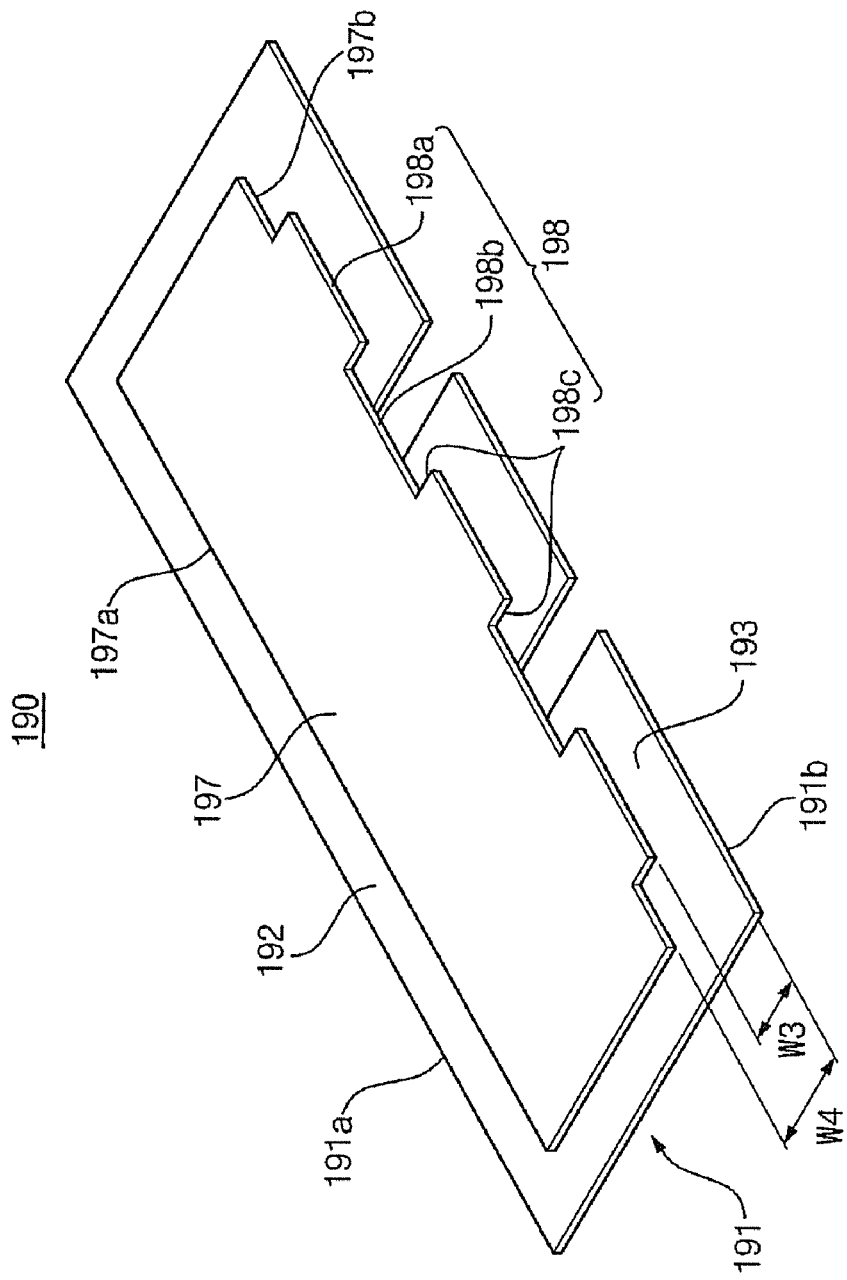
FIG. 3 is a perspective view illustrating another exemplary embodiment of a protecting cover in accordance with the present invention.

FIG. 3 is a perspective view illustrating another exemplary embodiment of a protecting cover in accordance with the present invention.

Referring to FIG. 3, a protecting cover 190 includes an adhesive film 191 and a base film 197 defining a first adhesive region 192, a second adhesive region 193 and a guide region. Long sides of the base film 197 include a first long side 197a and a second long side 197b. A first long side 191a and a second long side 191b of the adhesive film 191 may correspond to a longitudinal direction of the sidewall of the container. The protecting cover 190 is substantially the same as that of FIGS. 1 and 2 except for a shape of the adhesive film 191.

On the second long side 191b of the adhesive film 191 corresponding to an edge portion of the second adhesive region 193, some portions of the second long side 191b corresponding to spaces between the signal transfer films are incised or recessed. The base film 197 is disposed on the adhesive film 191 to cover a base or inner portion of the incised portions.

A second long side 197b of the base film 197 forms a boundary line 198 between a guide region (not shown) where the base film 197 is placed on the adhesive film 191 and a second adhesive region 193 in the adhesive film 191.

The boundary line 198 on the adhesive film 191 between the guide region and the second adhesive region 193 has an uneven shape corresponding to the profile or shape of the second long side 197b of the base film 197. The boundary line 198 includes a first portion 198a, a second portion 198b and a third portion 198c. The first portion 198a of the boundary line 198 is spaced apart from an edge of the second adhesive region 193 by a first gap W3. The second portion 198b of the boundary line 198 is spaced apart from the edge of the second adhesive region 193 by a second gap W4. The second gap W4 is wider than the first gap W3.

Figure 4:
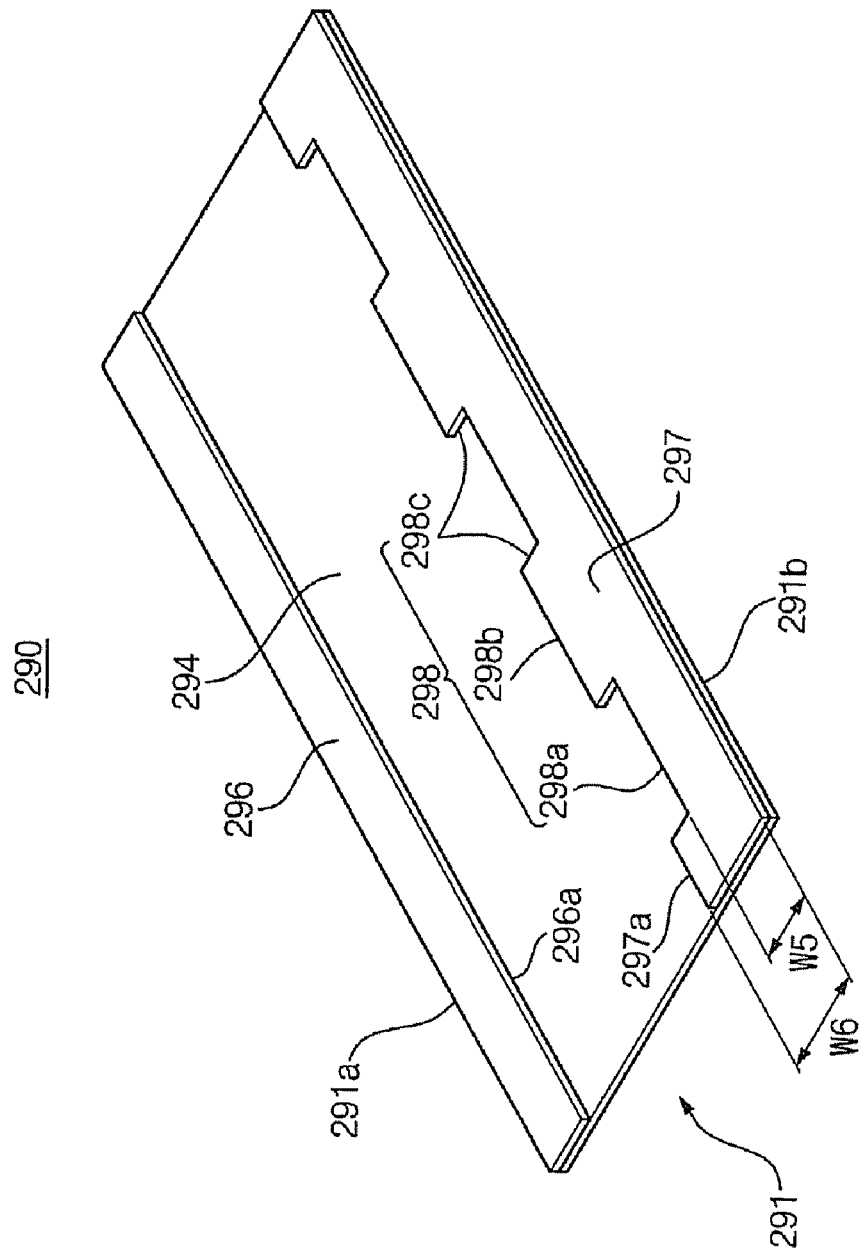
FIG. 4 is a perspective view illustrating another exemplary embodiment of a protecting cover in accordance with the present invention.

FIG. 4 is a perspective view illustrating another exemplary embodiment of a protecting cover in accordance with the present invention.

Referring to FIG. 4, a protecting cover 290 includes a base film 291, a first adhesive film 296 and a second adhesive film 297. The adhesive films 296 and 297 are disposed on and attached to the base film 291

The base film 291 has a substantially rectangular shape extending along a long side direction that corresponds to a longitudinal direction of the sidewall in a container. The base film 291 includes a first adhesive region, a second adhesive region and a guide region 294.

The first adhesive region of the base film 291 is defined along a first long side 296a of the first adhesive film 296. The first adhesive film 296 may have a substantially uniform width taken in a direction perpendicular from a first long side 291a of the base film 291 toward the first long side 296a of the first adhesive film 296. The second adhesive region of the base film 291 is defined along a first long side 297a of the second adhesive film 297. The second adhesive film 297 may have an uneven or varying width taken in a direction perpendicular from a second long side 291b of the base film 291 toward the first long side 297a of the second adhesive film 297.

The guide region 294 is disposed between the first adhesive region and the second adhesive region. A boundary line 298 between the guide region 294 and the second adhesive region includes a first portion 298a, a second portion 298b and a third portion 298c. The first portion 298a of the boundary line 298 in a position corresponding to the signal transfer film is spaced apart from an edge of the second adhesive region near the guide region 194. The first portion 298a is spaced apart from the second long side 291b of the base film 291 by a first gap W5. The second portion 298b of the boundary line 298 in a position corresponding to a space between the signal transfer films is spaced apart from the second long side 291b of the base film 291 (which forms an edge of the second adhesive region) by a second gap W6 that is wider than the first gap W5.

The first adhesive film 296 has a profile corresponding to that of the first adhesive region of the base film 291. The second adhesive film 297 has a profile corresponding to that of the second adhesive region of the base film 291.

Figure 5:
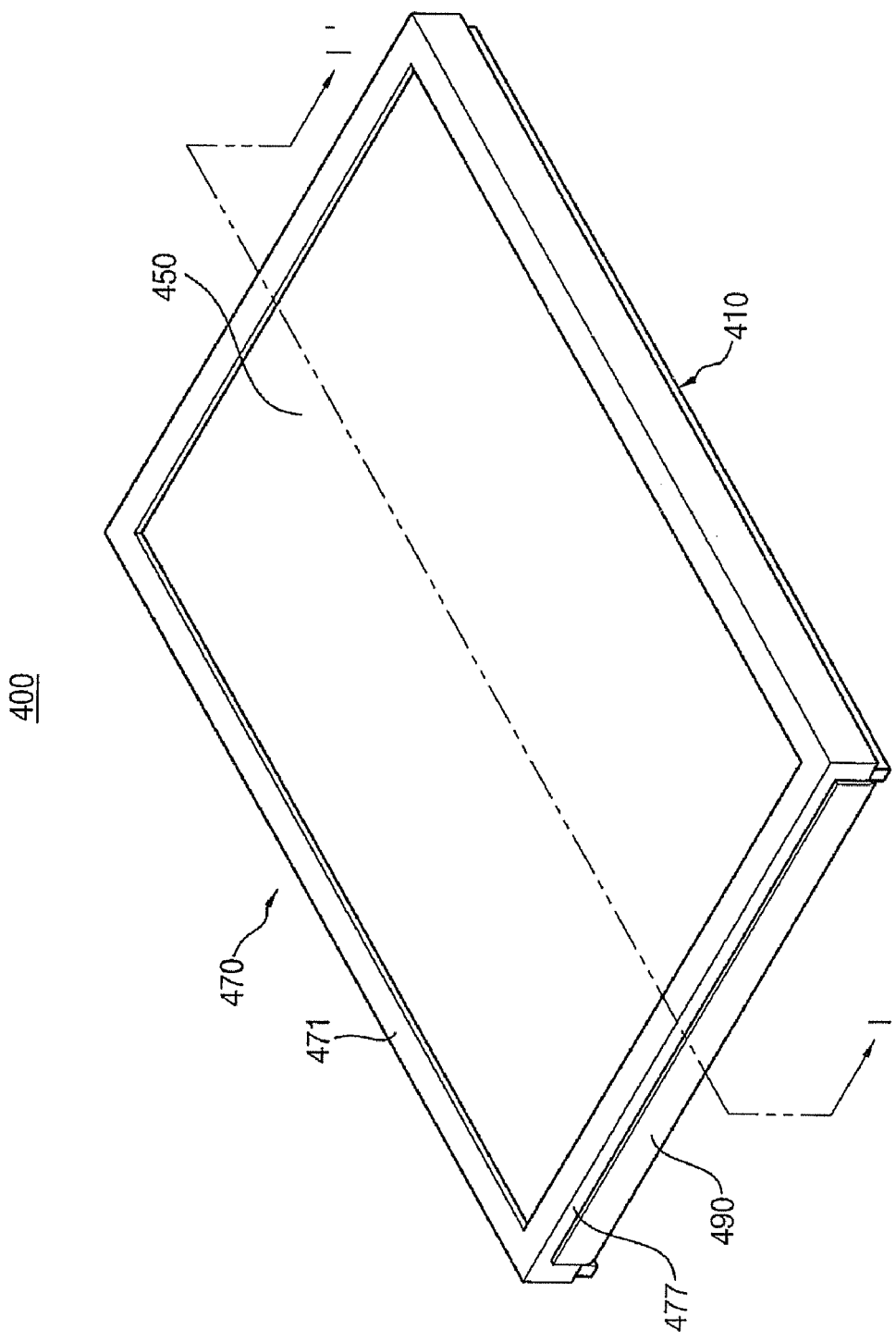
FIG. 5 is a perspective view illustrating an exemplary embodiment of a display device in accordance with the present invention.
Figure 6:
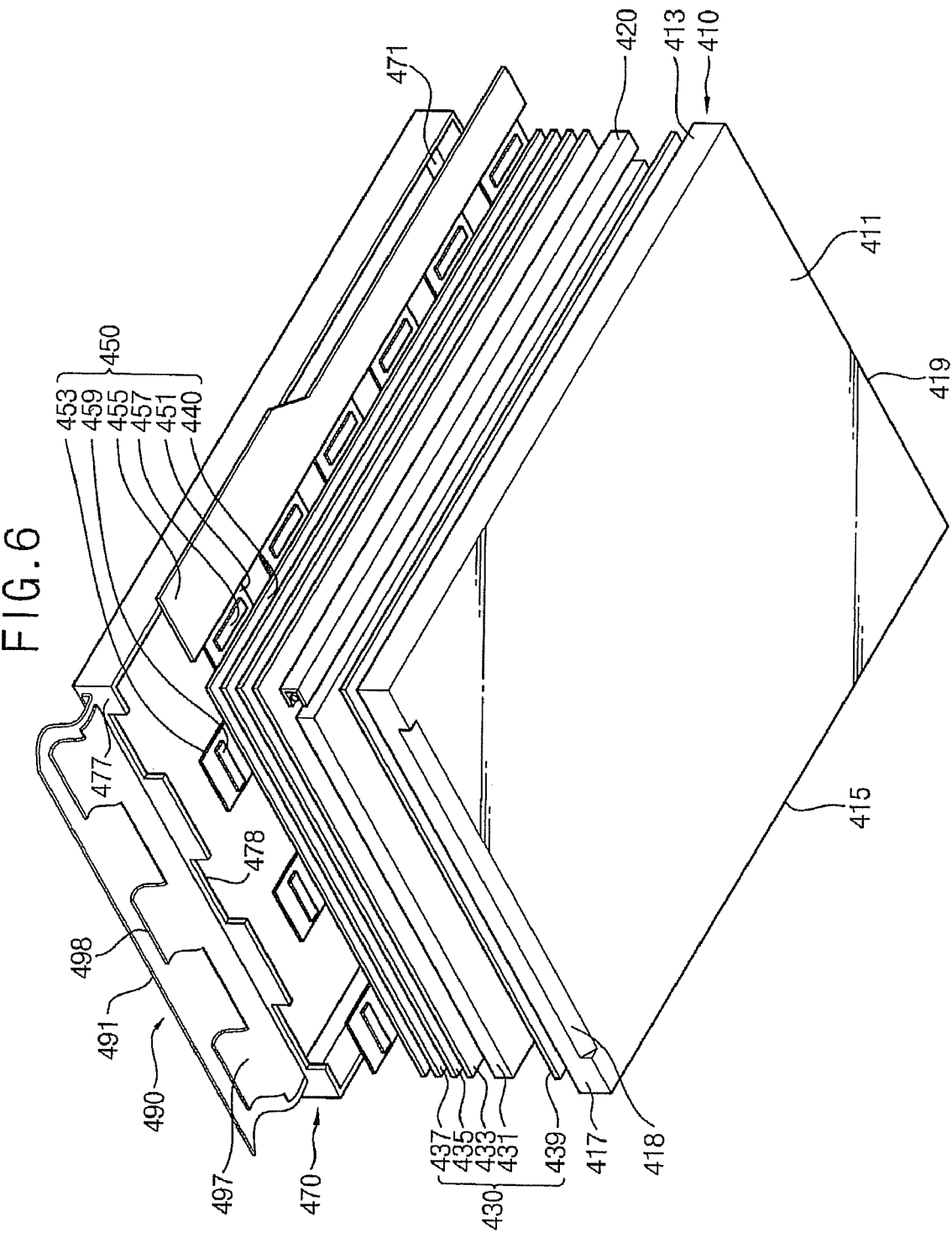
FIG. 6 is an exploded perspective view illustrating the display device shown in FIG. 5.

FIG. 5 is a perspective view illustrating an exemplary embodiment of a display device in accordance with the present invention. FIG. 6 is an exploded perspective view illustrating the display device shown in FIG. 5.

Referring to FIGS. 5 and 6, a display device 400 includes a container 410, a panel assembly 450, a front case 470 and a protecting cover 490.

The container 410 includes a bottom plate 411 and a first to a fourth sidewall 413, 415, 417 and 419, respectively. The first sidewall 413 and the second sidewall 415 are disposed at an outer region or edge of the bottom plate 411 to face each other. The third sidewall 417 and the fourth sidewall 419 are disposed at an outer region or edge of the bottom plate 411 and face each other to connect the first sidewall 413 and the second sidewall 415, respectively. Accordingly, the bottom plate 411, and the first to the fourth sidewalls 413, 415, 417 and 419 form a receiving space.

A chamfered part 418 is formed on a corner where an outer face of the third sidewall 417 meets a rear face of the bottom plate 411. In an exemplary embodiment, the chamfered part 418 forms an angle of about 45° relative to the outer face of the third sidewall 417 and the rear face of the bottom plate 411 to extend along a longitudinal direction of the third sidewall 417. A length of the chamfered part 418 along the longitudinal direction of the third sidewall 417 is at least as long or longer than that of the protecting cover 490 along the longitudinal direction of the third sidewall 417.

Figure 7:
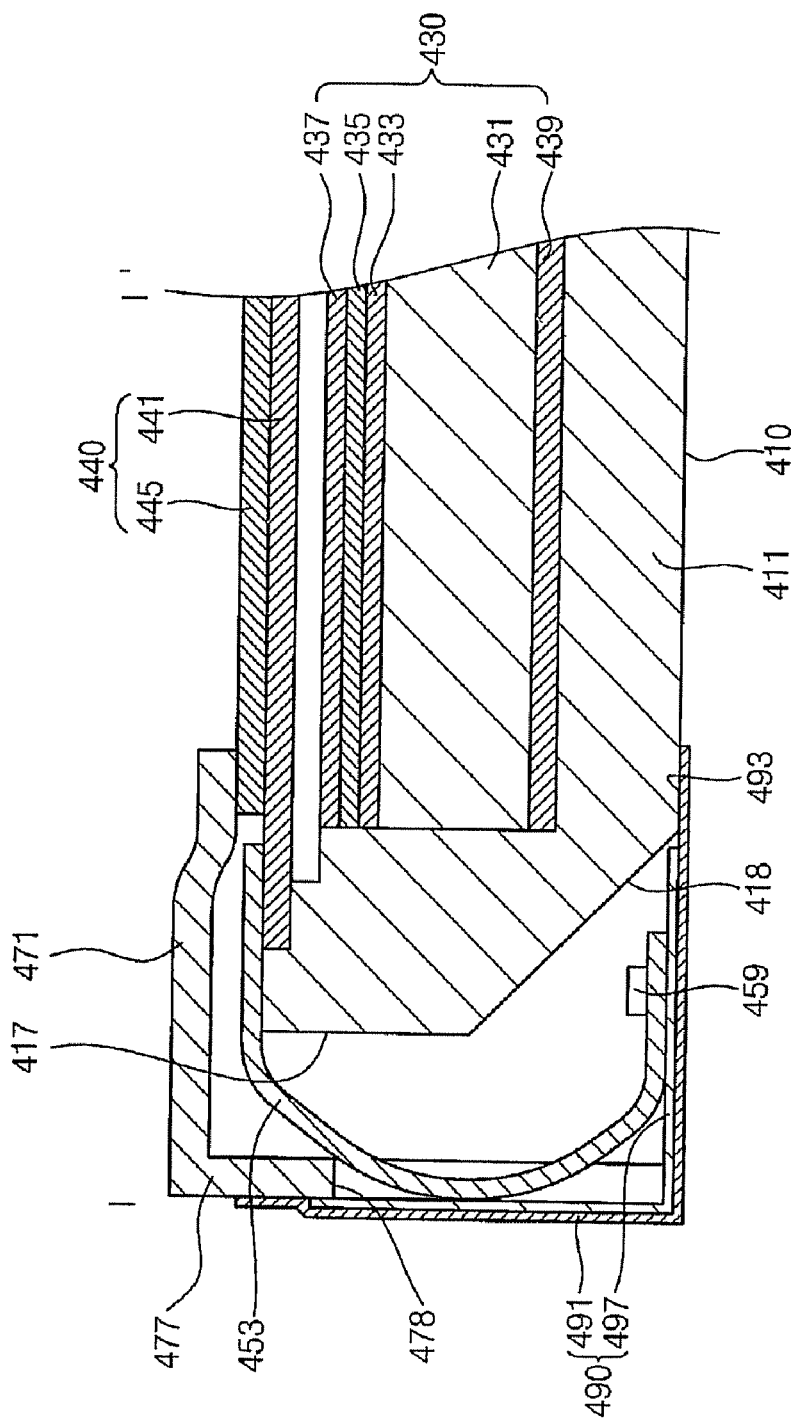
FIG. 7 is a cross-sectional view illustrating the display device taken along line I-I' illustrated in FIG. 5.

FIG. 7 is a cross-sectional view illustrating the display device taken along line I-I' illustrated in FIG. 5. Referring to FIGS. 5 to 7, the display device 400 further includes a light source 420 and an optical member 430.

The light source 420 includes a lamp and a lamp reflector. The lamp is disposed substantially parallel to and along the first sidewall 413. The lamp reflector encloses the lamp to protect the lamp. The lamp reflector concentrates a light generated from the lamp to reflect the light to the receiving space.

The optical member 430 improves optical properties of a light such as luminance, uniformity of the luminance, etc., which is provided from the light source 420. In an exemplary embodiment, the optical member 430 may include a light guide plate 431 guiding a path of light incident from the light source 420 to a diffusion sheet 433, the diffusion sheet 433 disposed on the light guide plate 431, collimating sheets 435 and 437 and/or a reflective sheet 439 disposed under the light guide plate 431.

The light guide plate 431 guides a light provided from a side to emit a light having an improved luminance distribution into the diffusion sheet 433. The diffusion sheet 433 is disposed on the light guide plate 431 to diffuse the light emitted from the light guide plate 431 into the collimating sheets 435 and 437. The collimating sheets 435 and 437 improve a front luminance of light emitted from the diffusion sheet 433. The reflective sheet 439 reflects a light leaked from the light guide plate 431 to the bottom plate 411 into the light guide plate 431.

The panel assembly 450 displays images based on a light provided from the optical member 430. The panel assembly 450 includes a display panel 440, a data signal transfer film 451 and a gate signal transfer film 453. The display panel 440 converts a light emitted from the optical member 430 into a light including image information. The display panel 440 is disposed on the optical member 430. The display panel 440 is contained in the container 410. In exemplary embodiments, the display panel 440 may be disposed on a stepped part of the first to fourth sidewalls 413, 415, 417 and 419. The display panel 440 includes a first substrate 441, a second substrate 445 and a liquid crystal layer (not shown) disposed between the first and second substrates 441 and 445.

The first substrate 441 includes a lower substrate and a switching device. The lower substrate includes transparent glass. Gate lines are formed on the lower substrate along a horizontal direction. Data lines are formed on the lower substrate along a vertical, direction insulated with the gate lines. The gate lines and the date lines define pixel regions. The pixel regions are arranged in a matrix shape.

In an exemplary embodiment, the switching device includes a thin film transistor. The thin film transistors are disposed in the pixel regions. The data line is connected to a source terminal of each thin film transistor. The gate line is connected to a gate terminal of each thin film transistor. A pixel electrode including transparent conductive material is connected to the drain terminal of each thin film transistor.

The second substrate 445 is disposed to face the first substrate 441 by a predetermined distance. The second substrate 445 includes an upper substrate and a color pixel. The color pixel is disposed on the upper substrate in a matrix shape corresponding to the pixel electrode that is disposed in the pixel region. The color pixel may include red, green and blue ("RGB") colored pixel displaying a predetermined color when a light passes through the RGB colored pixel. A common electrode including transparent conductive material is formed on the upper substrate having the color pixel corresponding to the pixel electrode.

When a power is applied to the gate terminal of the thin film transistor and then the thin film transistor turns on, an electric field is formed between the pixel electrode and the common electrode. Here, the electric field changes an arrangement of liquid crystals of a liquid crystal layer interposed between the first substrate 441 and the second substrate 445. Accordingly, a transmittance of a light provided from the light source 420 to the display panel 440 through the optical member 430 is changed, such that the display panel 440 displays images having a desired gray scale.

The data signal transfer film 451 is electrically connected to the data line. The gate signal transfer film 453 is electrically connected to the gate line. In an exemplary embodiment, the date signal transfer film 451 and the gate signal transfer film 453 may be a data tape carrier package and a gate tape carrier package, respectively. The data tape carrier package 451 and the gate tape carrier package 453 are protruded from the display panel 440 to an outside of the display panel 440.

The panel assembly 450 further includes an integrated printed circuit board 455 providing a data driving signal and a gate driving signal to drive the display panel 440. The integrated printed circuit board 455 is connected to the data line through the data tape carrier package 451.

The data driving signal provided from the integrated printed circuit board 455 is inputted into the data line through the integrated printed circuit board 455, the data tape carrier package 451 and the data line. In the meantime, the gate driving signal is inputted into the gate line through the integrated printed circuit board 455, the data tape carrier package 451, the signal transfer pattern formed on the first substrate, the gate tape carrier package 453 and the gate line.

The data tape carrier package 451 and the gate tape carrier package 453 include a data driving chip 457 and a gate driving chip 459, respectively. The data driving chip 457 and the gate driving chip 459 control a timing when the data driving signal and the gate driving signal provided from the integrated printed circuit board 455 are applied to the display panel 440.

The front case 470 fixes the display panel 440 to the container 410. In an exemplary embodiment, the front case 470 may be a chassis 470 combined with the container 410 to expose an effective display region of the display panel 440. In one exemplary embodiment, the chassis 470 may be formed from metallic material. The chassis 470 includes a first face 471 and a second face 477.

The first face 471 is disposed along an edge of the display panel 440 considered as an ineffective display region that does not display images and reduces or effectively prevents separation of the display panel 440 from the container 410. An effective display region of the display panel 440 is surrounded or enclosed by the ineffective display region and is exposed by the first face 471.

The second face 477 extends from an edge of the first face 471 to face the first to the four sidewalls 413, 415, 417 and 419 of the container 410. When the chassis 470 is combined to the container 410, a portion of the second face 477 corresponding to the third sidewall 417 bends the gate tape carrier package 453 toward the third sidewall 417 as illustrated in FIG. 7. A portion of the second face 477 corresponding to the first sidewall 413 bends the data tape carrier package 451 toward the first sidewall 413. The integrated printed circuit board 455 is disposed on a rear face of the bottom plate 411 from the bending of the data tape carrier package 451.

An incision part or notch 478 is formed on the second face 477 corresponding to the gate tape carrier package 453. In an exemplary embodiment, the incision part 478 may be a groove 478 formed by a predetermined depth from an edge of the second face 477 toward the first face 471. The number of the grooves 478 corresponds to that of the gate tape carrier packages 453. A width of the groove 478 taken in a direction parallel to the third sidewall 417 is at least as wide or wider than that of a span of all of the gate tape carrier packages 453 to increase a contact area of the gate tape carrier package 453 and the protecting cover 490.

Portions of the gate tape carrier package 453 bent by the second face 477 to face the third sidewall 417 are exposed outwardly through the groove 478.

The protecting cover 490 is substantially the same as that of FIGS. 1 and 2. The protecting cover 490 connects the second face 477 of the chassis 470 with the bottom plate 411 of the container 410. The protecting cover 490 includes an adhesive film 491 and a base film 497.

The adhesive film 491 extends along a longitudinal direction of the third sidewall 417. The base film 497 has a width narrower than that of the adhesive film 491 and a length shorter than that of the adhesive film 491. The base film 497 is attached to the adhesive film 491 and spaced apart from an edge of the adhesive film 491 by a predetermined distance. A first adhesive region attached to the second face 477 of the front case 470, a second adhesive region attached to a rear face of the bottom plate 411 and a guide region disposed between the first adhesive region and the second adhesive region are defined, respectively. The guide region is defined by a profile of the base film 497.

The protecting cover 490 guides the gate tape carrier package 453 bent by the second face 477 and exposed through the groove 478 toward the third sidewall 417 to protect the gate tape carrier package 453. As the gate tape carrier package 453 is bent, the gate driving chip 459 mounted on the gate tape carrier package 453 is disposed in the chamfered part 418 formed on the third sidewall 417.

When the gate tape carrier package 453 is fixed by the protecting cover 490, and the protecting cover 490 is attached to the second face 477 and the rear face of the bottom plate 411, a tensile force may be applied to the gate tape carrier package 453 or the tape carrier package 453 may be twisted. Hence, an edge portion of the gate tape carrier package 453 contacting the protecting cover 490 may not be attached to the protecting cover 490 but may be slidably contacted on the protecting cover 490.

As illustrated in FIGS. 1 and 2, a boundary line 98 (illustrated as 498 in FIG. 6) between the second adhesive region and a guide region includes a first portion, a second portion and a third portion. The first portion of the boundary 98*a* (shown FIG. 1) in a position corresponding to the gate tape carrier package 453 (shown FIG. 6) is spaced apart from an edge (e.g. second long side 91*b*) of the second adhesive region by a first gap. The second portion of the boundary 98*b* in a position corresponding to a space between the gate tape carrier packages 453 is spaced apart from an edge of the second adhesive region by a second gap that is wider than the first gap.

The edge portion of the gate tape carrier package 453 bent by the base film 497 is disposed on the base film 497 and attachment to the second adhesive region is reduced or effectively prevented.

In an exemplary embodiment of the display device 400, the edge portion of the gate tape carrier package 453 may be spaced apart from the edge of the second adhesive region by a gap greater than the second gap. In an alternative embodiment, when the protecting cover 490 is attached to the second face 477 and the rear face of the bottom plate 411, the edge portion of the gate tape carrier package 453 may be spaced apart from the edge of the second adhesive region by a gap less than the second gap. However, because of the above-mentioned profile of the base film 497, the edge portion of the gate tape carrier tape 453 may be spaced apart from the edge of the second adhesive region by a third gap that is greater than the first gap and still reduce or effectively prevent attachment to the second adhesive region of the edge portion of the gate tape carrier package 453 bent by the base film.

Advantageously, as long as the edge portion of the gate tape carrier package 453 bent by the base film is spaced apart from the edge of the second adhesive region by a gap greater than the first gap, a conductive pattern formed on the gate tape carrier package 453 is rarely damaged because the edge portion of the gate tape carrier package 453 is not attached to the second adhesive region 493.

Figure 8:
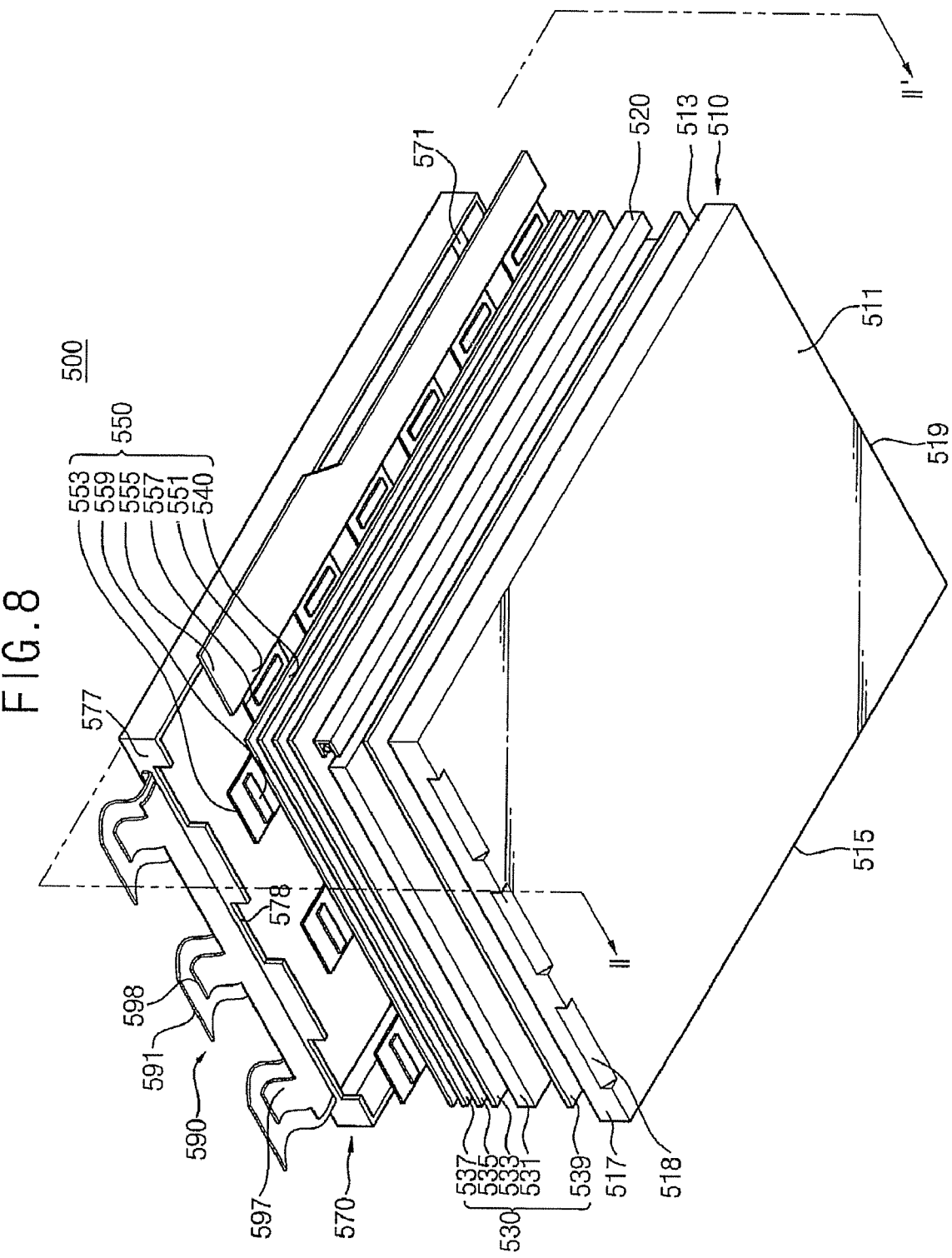
FIG. 8 is an exploded perspective view illustrating another exemplary embodiment of a display device in accordance with the present invention.
Figure 9:
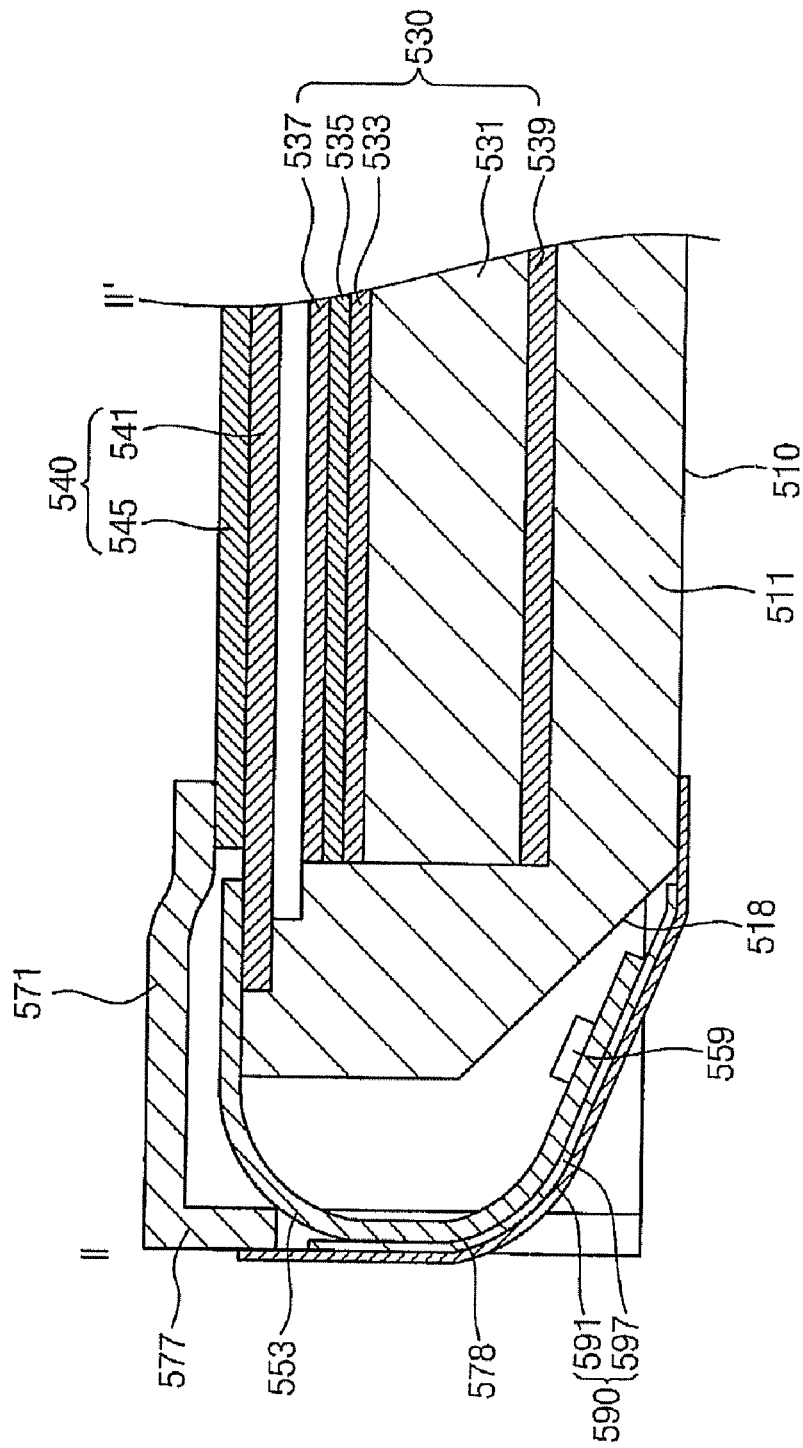
FIG. 9 is a cross-sectional view illustrating the display device taken along line II-II' in FIG. 8.

FIG. 8 is an exploded perspective view illustrating another exemplary embodiment of a display device in accordance with the present invention. FIG. 9 is a cross-sectional view illustrating the display device taken along line II-II' shown in FIG. 8.

Referring to FIGS. 8 and 9, a display device 500 includes a container 510, a light source 520, an optical member 530, a panel assembly 550, a front case 570 and a protecting cover 590. The display device 500 is substantially the same as that of FIGS. 5 to 7 except for the container 510 and the protecting cover 590.

The container 510 is substantially the same as that of FIGS. 5 to 7 except for a shape of a chamfered part 518 formed on a third sidewall 517. The container 510 includes a bottom plate 511 and a first to a fourth sidewall 513, 515, 517 and 519, respectively. A plurality of chamfered parts 518 corresponding to the number of the gate tape carrier packages 553 is formed on a corner of the container 510 where an outer side of the third sidewall 517 meets a rear face of the bottom plate 511. The chamfered part 518 forms an angle of about 45° relative to the outer side of the third sidewall 517 and the rear face of the bottom plate 511 to extend along a longitudinal direction of the third sidewall 517. A length of the chamfered part 518 along the longitudinal direction of the third sidewall 517 is greater than a width of an individual gate tape carrier package 553.

The optical member 530 improves optical properties of a light such as luminance, uniformity of the luminance, etc., which is provided from the light source 520. In an exemplary embodiment, the optical member 530 may include a light guide plate 531 guiding a path of light incident from the light source 520 to a diffusion sheet 533, the diffusion sheet 533 disposed on the light guide plate 551, collimating sheets 535 and 537 and/or a reflective sheet 539 disposed under the light guide plate 431.

The panel assembly 550 displays images based on a light provided from the optical member 530. The panel assembly 550 includes a display panel 540, a data signal transfer film 551 and a gate signal transfer film 553. The display panel 540 converts a light emitted from the optical member 530 into a light including image information.

The display panel 540 is disposed on the optical member 530. The display panel 540 is contained in the container 510. In exemplary embodiments, the display panel 540 may be disposed on a stepped part of the first to fourth sidewalls 513, 515, 517 and 519. The display panel 540 includes a first substrate 541, a second substrate 545 and a liquid crystal layer (not shown) disposed between the first and second substrates 541 and 545.

The panel assembly 550 further includes an integrated printed circuit board 555 providing a data driving signal and a gate driving signal to drive the display panel 540. The integrated printed circuit board 555 is connected to a data line through the data tape carrier package 551. The data tape carrier package 551 and the gate tape carrier package 553 include a data driving chip 557 and a gate driving chip 559, respectively. The data driving chip 557 and the gate driving chip 559 control a timing when the data driving signal and the gate driving signal provided from the integrated printed circuit board 555 are applied to the display panel 540.

The front case 570 fixes the display panel 540 to the container 510. In an exemplary embodiment, the front case 570 may be a chassis 570 combined with the container 510 to expose an effective display region of the display panel 540. In one exemplary embodiment, the chassis 570 may be formed from metallic material. The chassis 570 includes a first face 571 and a second face 577.

The first face 571 is disposed along an edge of the display panel 540 considered as an ineffective display region that does not display images and reduces or effectively prevents separation of the display panel 540 from the container 510. An effective display region of the display panel 540 is surrounded or enclosed by the ineffective display region and is exposed by the first face 571.

The second face 577 extends from an edge of the first face 571 to face the first to the four sidewalls 513, 515, 517 and 519 of the container 510. When the chassis 570 is combined to the container 510, a portion of the second face 577 corresponding to the third sidewall 517 bends the gate tape carrier package 553 toward the third sidewall 517 as illustrated in FIG. 7. A portion of the second face 577 corresponding to the first sidewall 513 bends the data tape carrier package 551 toward the first sidewall 513. The integrated printed circuit board 555 is disposed on a rear face of the bottom plate 511 from the bending of the data tape carrier package 551.

An incision part or notch 578 is formed on the second face 577 corresponding to the gate tape carrier package 553. In an exemplary embodiment, the incision part 578 may be a groove 578 formed by a predetermined depth from an edge of the second face 577 toward the first face 571. The number of the grooves 578 may correspond to that of the gate tape carrier packages 553. A width of the groove 578 taken in a direction parallel to the third sidewall 517 is at least as wide or wider than that of the gate tape carrier packages 553 to increase a contact area of the gate tape carrier package 553 and the protecting cover 590.

Portions of the gate tape carrier package 553 bent by the second face 577 to face the third sidewall 517 are exposed outwardly through the groove 578.

The protecting cover 590 is substantially the same as the protecting cover 190 shown in FIG. 3. The protecting cover 590 connects the second face 577 of the chassis 570 with the bottom plate 511 of the container 510. The protecting cover 590 includes an adhesive film 591 and a base film 597. As illustrated in FIG. 8, grooves are formed in the adhesive film 591 corresponding to spaces between the gate tape carrier packages 553. Here, a length of the chamfered part 518 along the longitudinal direction of the third sidewall 517 is greater than a width of an edge portion of the adhesive film 591 separated by the grooves.

As illustrated in FIG. 3, a boundary line 198 (illustrated as 598 in FIG. 8) between the second adhesive region and a guide region includes a first portion, a second portion and a third portion. The first portion of the boundary 198a (shown FIG. 3) in a position corresponding to the gate tape carrier package 553 (shown FIG. 8) is spaced apart from an edge (e.g. second long side 191b) of the second adhesive region by a first gap. The second portion of the boundary 198b in a position corresponding to a space between the gate tape carrier packages 553 is spaced apart from an edge of the second adhesive region by a second gap that is wider than the first gap.

As illustrated in FIG. 9, a contact area in which the gate tape carrier package 553 makes contact with the protecting cover 590 is increased. As a result, the protecting cover 590 bends the gate tape carrier package 553 with a relatively small curvature to reduce damage on a conductive pattern that may be generated by bending the gate tape carrier package 553. The protecting cover 590 guides the gate tape carrier package 553 closer to the third sidewall 517.

Figure 10:
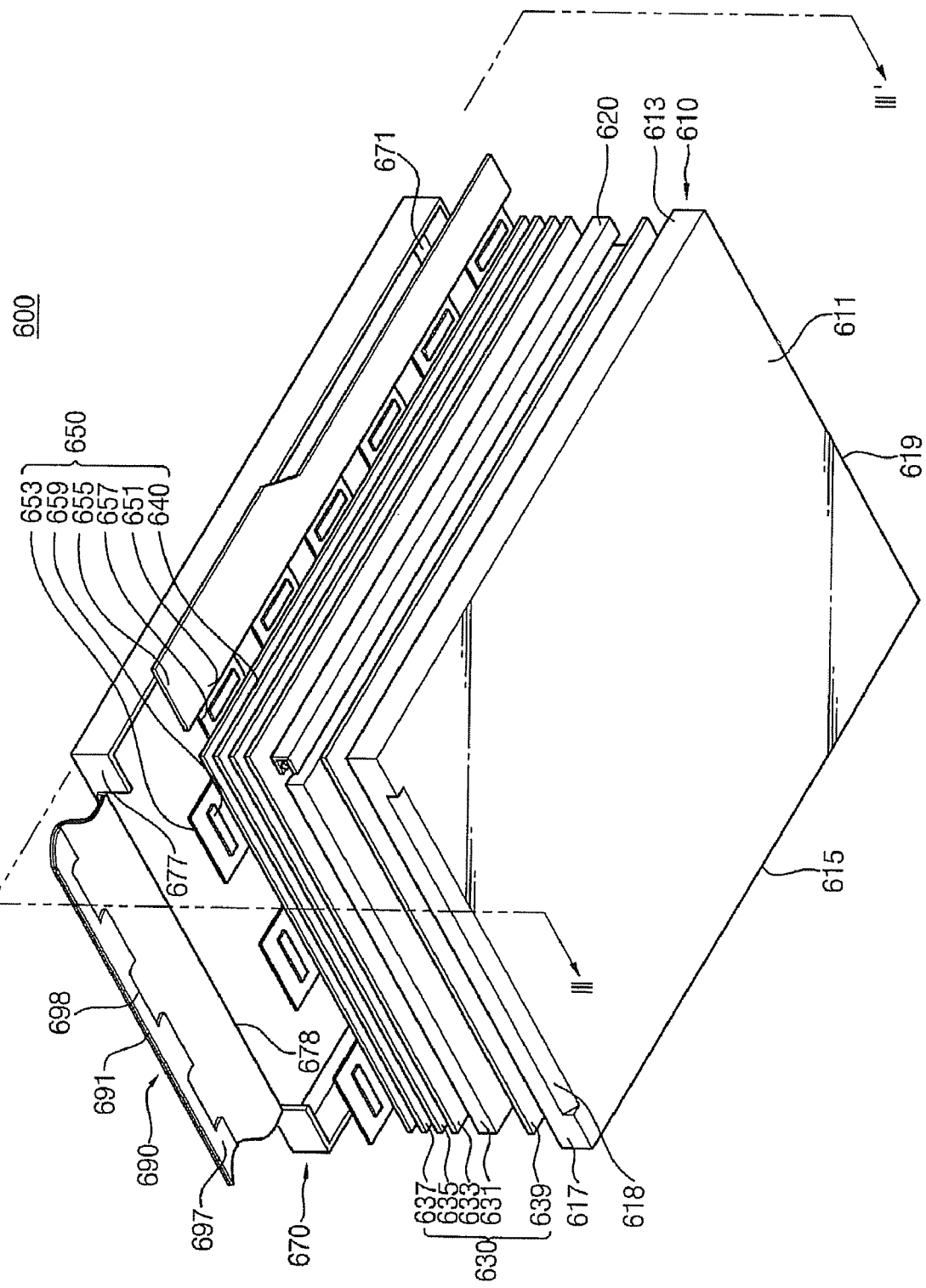
FIG. 10 is an exploded perspective view illustrating another exemplary embodiment of a display device in accordance with the present invention.
Figure 11:
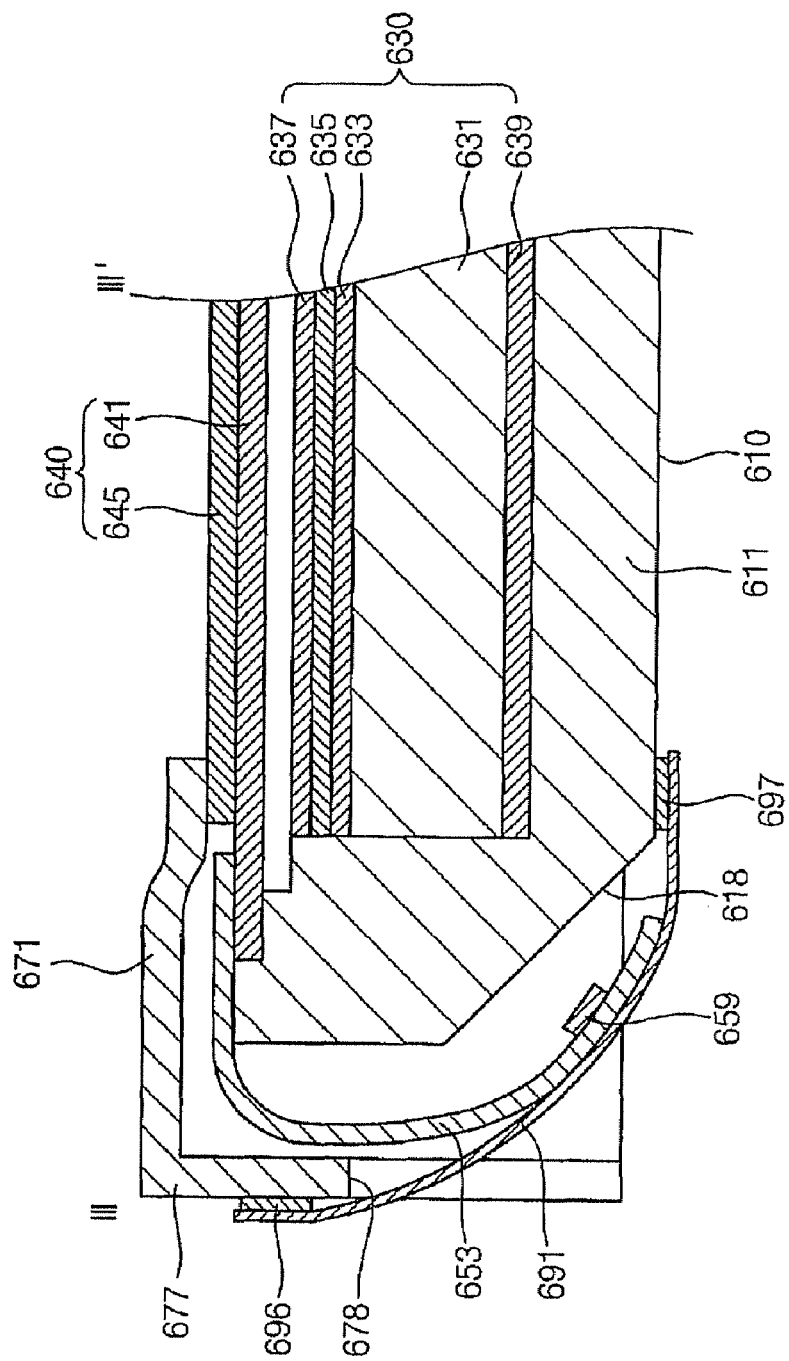
FIG. 11 is a cross-sectional view illustrating the display device taken along line III-III' shown in FIG. 10.

FIG. 10 is an exploded perspective view illustrating an exemplary embodiment of a display device in accordance with the present invention. FIG. 11 is a cross-sectional view illustrating the display device taken along line III-III' shown in FIG. 10.

Referring to FIGS. 10 and 11, a display device 600 includes a container 610, a light source 620, an optical member 630, a panel assembly 650, a front case 670 and a protecting cover 690. The display device 600 is substantially the same as that of FIGS. 5 to 7 except for the front case 670 and the protecting cover 690.

The container 610 includes a bottom plate 611 and a first to a fourth sidewall 613, 615, 617 and 619, respectively. A chamfered part 618 is formed on a corner where an outer face of the third sidewall 617 meets a rear face of the bottom plate 611. In an exemplary embodiment, the chamfered part 618 forms an angle of about 45° relative to the outer face of the third sidewall 617 and the rear face of the bottom plate 611 to extend along a longitudinal direction of the third sidewall 617. A length of the chamfered part 618 along the longitudinal direction of the third sidewall 617 is at least as long or longer than that of the protecting cover 690 along the longitudinal direction of the third sidewall 617.

The optical member 630 improves optical properties of a light such as luminance, uniformity of the luminance, etc., which is provided from the light source 620. In an exemplary embodiment, the optical member 630 may include a light guide plate 631 guiding a path of light incident from the light source 620 to a diffusion sheet 633, the diffusion sheet 633 disposed on the light guide plate 651, collimating sheets 635 and 637 and/or a reflective sheet 639 disposed under the light guide plate 631.

The panel assembly 650 displays images based on a light provided from the optical member 630. The panel assembly 650 includes a display panel 640, a data signal transfer film 651 and a gate signal transfer film 653. The display panel 640 converts a light emitted from the optical member 630 into a light including image information.

The display panel 640 is disposed on the optical member 630. The display panel 640 is contained in the container 610. In exemplary embodiments, the display panel 640 may be disposed on a stepped part of the first to fourth sidewalls 613, 615, 617 and 619. The display panel 640 includes a first substrate 641, a second substrate 645 and a liquid crystal layer (not shown) disposed between the first and second substrates 641 and 645.

The panel assembly 650 further includes an integrated printed circuit board 655 providing a data driving signal and a gate driving signal to drive the display panel 640. The integrated printed circuit board 655 is connected to a data line through the data tape carrier package 651. The data tape carrier package 651 and the gate tape carrier package 653 include a data driving chip 657 and a gate driving chip 659, respectively. The data driving chip 657 and the gate driving chip 659 control a timing when the data driving signal and the gate driving signal provided from the integrated printed circuit board 655 are applied to the display panel 640.

The front case 670 is substantially the same as that of. 5 to 7 except for a shape of a groove 678 formed on a second face 677. The first face 671 is disposed along an edge of the display panel 640 considered as an ineffective display region that does not display images and reduces or effectively prevents separation of the display panel 640 from the container 610. An effective display region of the display panel 640 is surrounded or enclosed by the ineffective display region and is exposed by the first face 671.

The second face 677 extends from an edge of the first face 671 to face the first to the four sidewalls 613, 615, 617 and 619 of the container 610. When the chassis 670 is combined to the container 610, a portion of the second face 677 corresponding to the third sidewall 617 bends the gate tape carrier package 653 toward the third sidewall 617 as illustrated in FIG. 11. A portion of the second face 677 corresponding to the first sidewall 613 bends the data tape carrier package 651 toward the first sidewall 613. The integrated printed circuit board 555 is disposed on a rear face of the bottom plate 611 from the bending of the data tape carrier package 651.

The groove 678 is formed on the second face 677 of the front case 670 containing the gate tape carrier package 653. The groove 678 is formed by a predetermined depth from an edge portion of the second face 677 toward a first face 671 of the front case 670.

The groove 678 may have a depth large enough to increase a contact area in which the gate tape carrier package 653 contacts the protecting cover 690. Portions of the gate tape carrier package 653 bent by the second face 677 to face the third sidewall 617 are exposed outside through the groove 678.

The protecting cover 690 is substantially the same as that of the exemplary embodiment described with reference to FIG. 4. Referring to FIGS. 10 and 11, the protecting cover 690 includes a base film 691, a first adhesive film 696 and a second adhesive film 697.

The base film 691 has a rectangular shape extending along a longitudinal direction of the third sidewall 617. The first adhesive film 696 is attached to an edge portion of a long side of the base film 691 and the second adhesive film 697 is attached to an edge portion of the other long side facing the long side of the base film 691.

A first adhesive region corresponding to a profile of the first adhesive film 696, a second adhesive region corresponding to a profile of the second adhesive film 697 and a guide region corresponding to a profile of the base film 691 positioned between the first adhesive film 696 and the second adhesive film 697 are defined, respectively. The first adhesive film 696 is attached to a second face 677 of the front case 670 and the second adhesive film 697 is attached to a rear face of a bottom plate 611.

A boundary line 698 between the guide region and the second adhesive region includes a first portion, a second portion and a third portion. The first portion of the boundary line 698 in a position corresponding to a gate tape carrier package 653 is spaced apart from an edge of the second adhesive region that is an edge of the base film 691, by a first gap. The second portion of the boundary line 698 in a position corresponding to a space between the gate tape carrier packages 653 is spaced apart from an edge of the base film 691 by a second gap that is wider than the first gap.

The edge portion of the gate tape carrier package 653 is bent by the base film 691 of the guide region. The edge portion of the gate tape carrier package 653 is spaced apart from an edge of the second adhesive region 693 by a gap between the first gap and the second gap.

According to the illustrated exemplary embodiments, a boundary line between a base film and a second adhesive region includes a first portion and a second portion. The first portion of the boundary line in a position corresponding to a gate tape carrier package is spaced apart from an edge of the second adhesive region by a first gap. The second portion of the boundary line in a position corresponding to a space between the gate tape carrier packages is spaced apart from the edge of the second adhesive region by a second gap that is wider than the first gap. Accordingly, an edge portion of the gate tape carrier package is not attached to an adhesive film but is slidably disposed on the base film. Advantageously, when fabricating a display device and using a display device, a conductive pattern formed on the gate tape carrier package is rarely damaged from external force such as tensile force, shear stress, etc., applied to the gate tape carrier package.

In an exemplary embodiment, a groove is formed on a second face of a front case, exposing portions of the gate tape carrier package. Accordingly, a contact area that a protecting cover make contact with a gate tape carrier package is increased to fix the gate tape carrier package to a desired position of a container. Advantageously, damages to the gate tape carrier package caused by incorrect fabrication of the gate tape carrier package are reduced.

In an exemplary embodiment, a gate driving chip mounted on the gate tape carrier package is contained in a chamfered part formed on a third sidewall of the container to be bent toward a downside. When fabricating the front case and the container, bending of the gate tape carrier package over the display device is reduced or effectively prevented. Advantageously, efficiency for fabricating a display device may be improved.

In the illustrated exemplary embodiments, reliability for transmitting a driving signal from an integrated printed circuit board to the display panel is improved.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A protecting cover for a display device including a signal transfer film connected to a display panel and a container receiving the display panel, the protecting cover bending the signal transfer film toward a sidewall of the container and comprising:
    a first adhesive region attached to a sidewall of a front case, the front case being is combined with the container and the first adhesive region covering an edge of a display panel;
    a second adhesive region attached to a rear face of a bottom plate of the container; and
    a guide region between the first adhesive region and the second adhesive region, the guide region guiding the signal transfer film,
    wherein a first portion of a boundary line between the guide region and the second adhesive region in a position corresponding to the signal transfer film is spaced apart from an edge of the second adhesive region by a first gap; and
    wherein a second portion of the boundary line between the guide region and the second adhesive region in a position corresponding to a space between adjacent signal transfer films is spaced apart from the edge of the second adhesive region by a second gap wider than the first gap.

2. The protecting cover of claim 1, further comprising:
    an adhesive film including the first adhesive region, the second adhesive region and the guide region; and a base film attached to the guide region, the base film bending an edge portion of the signal transfer film toward the sidewall of the container.

3. The protecting cover of claim 2, wherein the boundary line is defined by a profile of the base film.

4. The protecting cover of claim 2, wherein the edge portion of the signal transfer film is disposed in the guide region.

5. The protecting cover of claim 2, wherein portions of the adhesive film corresponding to spaces between the adjacent signal transfer films are incised or recessed and the base film covers an inner portion of the incised portions.

6. The protecting cover of claim 1, further comprising:
a base film including the first adhesive region, the second adhesive region and the guide region; and
a first adhesive film attached to the first adhesive region and a second adhesive film attached to the second adhesive region, a profile of the second adhesive film defining the boundary line.

7. A display device comprising:
a container including a bottom plate and a sidewall placed on an outer side of the bottom plate and forming a receiving space;
a panel assembly including a display panel disposed in the receiving space and a signal transfer film connected to an edge portion of the display panel;
a front case including a first face covering the edge portion of the display panel and a second face covering the sidewall of the container; and
a protecting cover including a first adhesive region attached to the second face, a second adhesive region attached to a rear face of the bottom plate and a guide region arranged between the first adhesive region and the second adhesive region and guiding the signal transfer film,
wherein a first portion of a boundary line between the guide region and the second adhesive region in a position corresponding to the signal transfer film is spaced apart from an edge of the second adhesive region by a first gap; and
wherein a second portion of the boundary line between the guide region and the second adhesive region in a position corresponding to a space between adjacent signal transfer films is spaced apart from the edge of the second adhesive region by a second gap wider than the first gap.

8. The display device of claim 7, further comprising:
an adhesive film including the first adhesive region, the second adhesive region and the guide region; and
a base film attached to the guide region and defining the boundary line, the base film bending an edge portion of the signal transfer film toward the sidewall of a container.

9. The display device of claim 8, wherein the edge portion of the signal transfer film is spaced apart from the edge of the second adhesive region by a third gap wider than the first gap and narrower than the second gap.

10. The display device of claim 8, wherein the base film comprises polyethylene terephthalate.

11. The display device of claim 7, further comprising:
a base film including the first adhesive region, the second adhesive region and the guide region; and
a first adhesive film attached to the first adhesive region and a second adhesive film attached to the second adhesive region, the second adhesive film defining the boundary line, the first adhesive film being attached to the second face and the second adhesive film being attached to a rear face of the bottom plate.

12. The display device of claim 7, wherein the second face has an incision part exposing a portion of the bent signal transfer film.

13. The display device of claim 12, wherein a width of the incision part is substantially equal to or wider than that of an individual one of the signal transfer film.

14. The display device of claim 12, wherein a width of the incision part is substantially equal to or wider than a distance between outermost edges of outermost signal transfer films.

15. The display device of claim 12, wherein portions of the signal transfer film exposed through the incision part are bent by the guide region.

16. The display device of claim 7, wherein the sidewall comprises a chamfered part on which a driving chip mounted on the signal transfer film is arranged.

17. The display device of claim 16, wherein a width of the chamfered part is substantially equal to or wider than that of an individual one of the signal transfer film.

18. The display device of claim 16, wherein a width of the chamfered part is substantially equal to or wider a distance between outermost edges of outermost signal transfer films.

* * * * *